(12) United States Patent
Yamamura et al.

(10) Patent No.: US 6,567,265 B1
(45) Date of Patent: May 20, 2003

(54) APPARATUS HAVING FLEXIBLE MOUNTING MECHANISM

(75) Inventors: Toshiki Yamamura, Suita (JP); Toshiyuki Wada, Toyonaka (JP); Makoto Kuwamoto, Hirakata (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 1045 days.

(21) Appl. No.: 08/751,545

(22) Filed: Nov. 18, 1996

(30) Foreign Application Priority Data

Nov. 20, 1995 (JP) .............................................. 7-301459

(51) Int. Cl.⁷ ................................................ G06F 1/16
(52) U.S. Cl. ........................ 361/685; 248/638; 206/523; 206/591; 206/588
(58) Field of Search ...................... 364/708.1; 361/685; 206/523, 591, 594, 588; 298/638, 634

(56) References Cited

U.S. PATENT DOCUMENTS

| | | | |
|---|---|---|---|
| 4,713,714 A | * 12/1987 | Gatti et al. ............. | 248/638 X |
| 4,812,932 A | 3/1989 | Hishinuma et al. ...... | 360/97.01 |
| 4,815,605 A | * 3/1989 | Brissier et al. ............. | 206/523 |
| 5,079,655 A | 1/1992 | Yagi ........................ | 360/97.02 |
| 5,235,482 A | 8/1993 | Schmitz ................... | 360/97.02 |
| 5,253,129 A | 10/1993 | Blackborow et al. ......... | 360/69 |
| 5,349,486 A | 9/1994 | Sugimoto et al. ......... | 360/97.01 |
| 5,366,200 A | 11/1994 | Scura ......................... | 248/632 |
| 5,491,608 A | * 2/1996 | Koyanagi et al. ........... | 361/685 |

FOREIGN PATENT DOCUMENTS

JP  2-137181  * 5/1990 ................. 361/685

* cited by examiner

*Primary Examiner*—Darren Schuberg
*Assistant Examiner*—Lisa Lea-Edmonds
(74) *Attorney, Agent, or Firm*—Renner, Otto, Boisselle & Sklar

(57) ABSTRACT

An apparatus having a flexible mounting mechanism according to the present invention includes a storage section, a casing accommodating and holding the storage section, a protective housing accommodating and protecting the casing, a supporting member provided between the casing and the protective housing for supporting the casing, and a maintaining member supporting the protective housing. The supporting member and the maintaining member have different vibration damping characteristics.

3 Claims, 13 Drawing Sheets

Plan cross-sectional view

Direction of storage unit pack

Transverse cross-sectional view

APPARATUS HAVING FLEXIBLE MOUNTING MECHANISM

BACKGROUND OF THE INVENTION

1. Field of the Invention

The present invention relates to an apparatus having a flexible mounting mechanism for enhancing vibration resistance and impact resistance. More particularly, the present invention relates to an apparatus such as a portable device for recording and reproducing signals and a removable storage unit pack compatible with the device.

2. Description of the Related Art

Recently, devices for recording and/or reproducing digitized data such as digitized audiovisual signals (i.e., digital signals) are used for various applications. The digital signals are easy to process by computers and are not degraded even when duplicated. Thus, audiovisual devices (hereinafter, simply referred to as "AV devices") for manipulating and editing digitized signals are widely used, particularly for industrial applications (e.g., television broadcasting, films, and the like).

Hard disk drives (hereinafter, simply referred to as "HDDs") are used as storage units for recording digital signals because of their high storage capacity and recording and reproducing speeds. At present, a 3.5 inch HDD having a capacity of $4 \times 10^9$ bytes is known, and storage capacity of HDDs is expected to increase at an annual rate of 60%.

AV devices which use removable HDDs have been popularized. An HDD records data in a storage medium and reproduce data stored in the storage medium via a magnetic head which follows information tracks several micrometers wide, from several tens of nanometers above the storage medium. Due to the close ranges between the magnetic head and the storage medium required to properly record or reproduce the data, the HDD is susceptible to damage or malfunction due to vibration and impact.

Vibration or impact may cause such problems that data may not be stored in the storage medium or data stored in the storage medium may not be reproduced. Specifically, vibration or impact may cause the magnetic head to damage the storage medium. In such a case, data stored in the damaged portion of the storage medium may not be reproduced. Vibration or impact may also break the magnetic head.

Maintaining the reliability of the HDD is one of the most important design and manufacturing properties for the AV device incorporating the HDD. Flexible mounting mechanisms are preferably used to improve the vibration and impact resistance of the HDD and thus maintain reliability.

Hereinafter, a conventional HDD pack 63 having a flexible mounting mechanism will be described with reference to FIGS. 13 and 14. FIG. 13 is an isometric exploded view showing the conventional HDD pack 63. FIG. 14 is a cross-sectional view showing the same HDD pack 63.

The HDD pack 63 includes a head disk assembly (hereinafter, simply referred to as an "HDA") 50 and a protective housing 52. As shown in FIG. 14, the HDA 50 includes disks 57 (as magnetic storage media); a spindle motor 58 for supporting and rotating the disks 57; magnetic heads 59 for recording data in the storage media and reproducing data stored in the storage media; arms 60 for supporting the magnetic heads 59; an driving section 61 for positioning the magnetic heads 59; and a casing 62 accommodating all the above-mentioned elements. As shown in FIG. 13, receiving members 51 are fixed on the upper, bottom and side surfaces of the casing 62 of the HDA 50. The protective housing 52 includes an upper plate 53, a frame 54 and a bottom plate 55 and is provided for protection of the HDA 50. The supporting members 56 are provided between the receiving members 51 and the protective housing 52, thereby supporting the HDA 50 in the protective housing 52.

An apparatus which utilizes an apparatus having a removable HDD pack is proposed, for example, in the U.S. Pat. No. 5,253,129.

Since the supporting members 56 can reduce damage to the HDD pack 63 caused by an external force, the HDD pack 63 can be removed from the apparatus and carried by itself. However, conventional removable HDD pack 63 is intended to be incorporated in a stable apparatus.

An HDD pack used in apparatuses carried by users, for example portable AV devices, needs to withstand impact which may be caused when the apparatus is hit by an obstacle or vibrated as the apparatus is transported.

Generally, a conventional HDD can withstand an impact acceleration of approximately 300 G when the HDD is not operated. However, when the HDD pack is dropped on a tile floor from a height of 76 cm, the impact acceleration on the HDD pack is about 1500 G or more.

When an HDD pack is operated in a portable AV device while being moved, the maximum acceptable impact acceleration on the HDD may be as much as about 10 G. The HDD pack built in AV device is required to record and reproduce data with a high reliability even under such circumstances.

Carrying an HDD pack separately from an AV device may induce a vibration acceleration of up to approximately 4 G and at a frequencies of up to approximately several hundred hertz on the HDD pack. When an HDD pack is operated in the AV device while being carried, a vibration acceleration of up to approximately 2 G and at frequency of up to several hundred hertz may be applied to the HDD pack.

Thus, the conventional HDD pack is subject to damage and malfunction caused by impact and vibration of the AV device. The problems caused by vibration include, for example, defective recording and/or defective reproduction of data; damage to the storage medium by the magnetic head which results in defective reproduction of data written in the damaged portions of the storage medium; and breakage of the magnetic head. The problem caused by impact includes, for example, defective recording and/or defective reproduction of data; damage to the storage medium given by the magnetic heads which results in defective reproduction of data written in the damaged portions of the storage medium; and breakage of the magnetic head.

In order to use an HDD as a removable storage unit, the HDD needs to have satisfactory impact resistance to avoid defective recording or reproduction of data, elimination of data, or structural damage, even if the apparatus or the HDD is dropped while being carried or when the HDD is inserted into or ejected from the apparatus. Additionally, satisfactory vibration resistance of the HDD is required to similarly avoid defective recording and/or reproduction of data, elimination of data, or structural damage even while being accommodated in a portable AV device for recording or reproduction.

The force against an HDD varies in type, magnitude and frequency, depending on whether the HDD is carried separately or operated in the portable AV device. The flexible mounting mechanism for the HDD must absorb or counteract the force under any conditions. Conventionally, a small flexible mounting mechanism cannot effectively control both impact and vibration. Since the conventional flexible mounting mechanism is required to be quite larger to reduce both impact and vibration, it is not suitable for portable AV devices.

SUMMARY OF THE INVENTION

An apparatus having a flexible mounting mechanism according to the present invention includes a storage section, a casing accommodating and holding the storage section, a protective housing accommodating and protecting the casing, a supporting member provided between the casing and the protective housing for supporting the casing, and a maintaining member supporting the protective housing. The supporting member and the maintaining member have different vibration damping characteristics.

In one embodiment of the present invention, a spring constant of the supporting member is larger than a spring constant of the maintaining member.

In another embodiment of the present invention, the maintaining member supports the protective housing such that the protective housing is removable from the apparatus.

In still another embodiment of the present invention, the protective housing is made of a material that satisfies a relationship, $$Gh<Gf$$

where Gh is an impact acceleration at which the protective housing breaks and Gf is an impact acceleration at which the storage section is rendered inoperable.

In one embodiment of the present invention, the material forming the protective housing is a resin.

In still another embodiment of the present invention, the storage section includes a storage medium for storing data, a spindle motor for rotating the storage medium, a head for recording data in the storage medium and reproducing data stored in the storage medium, and a driving section capable of positioning the head at an arbitrary position with respect to the storage medium.

In yet still another embodiment of the present invention, a primary resonance frequency obtained by the spring constant of the supporting member and the total mass of the storage section, the casing, the supporting member and the protective housing is lower than a rotational frequency of the spindle motor.

In one embodiment of the present invention, the apparatus is a portable audiovisual device.

In another embodiment of the present invention, the apparatus is a portable computer.

According to another aspect of the present invention, an apparatus having a flexible mounting mechanism, includes a storage section, a casing accommodating and holding the storage section, a protective housing accommodating and protecting the casing, a supporting member provided between the casing and the protective housing for supporting the casing in the protective housing, and a elastic member provided between the casing and the protective housing. A spring constant k1 of the supporting member and a spring constant k2 of the elastic member have a relationship of k1<k2.

In one embodiment of the present invention, the elastic member has a first end and a second end. The first end of the elastic member is fixed to the casing. Moreover, a space is provided between the second end of the elastic member and the protective housing under steady-state conditions.

In another embodiment of the present invention, the elastic member has a first end and a second end. The first end of the elastic member is fixed to the protective housing. Moreover, a space is provided between the second end of the elastic member and the casing under a steady-state.

In still another embodiment of the present invention, the apparatus further includes a receiving member provided in the protective housing. The supporting member is deformed when the second end of the elastic member makes contact with the receiving member.

In yet still another embodiment of the present invention, the elastic member is a metal leaf spring.

In another embodiment of the present invention, the supporting member is a gel-like member.

According to another aspect of the present invention, the apparatus having a flexible mounting mechanism includes a storage section, a casing accommodating and holding the storage section, a protective housing accommodating and protecting the casing and a supporting member for supporting the casing in the protective housing. The supporting member includes a first hollow portion, a second hollow portion, a neck portion having a hollow, and a medium. The first hollow portion communicates with the second hollow portion through the neck portion. Furthermore, the medium flows either from the first hollow portion to the second hollow portion through the neck portion, or from the second hollow portion to the first hollow portion through the neck portion to dissipate impact on the casing.

In one embodiment of the present invention, the apparatus further includes a receiving member having a hole for receiving the neck portion of the supporting member. The receiving member is fixed to the casing.

In another embodiment of the present invention, the supporting member has a bellows-shaped end.

In yet still another embodiment of the present invention, the medium is oil.

In still another embodiment of the present invention, the apparatus further includes a first connector and a second connector and a plurality of flexible conductive wires. The first connector is provided in the casing and electrically connected to the storage section, and the second connector is provided in the protective housing and connected to the first connector via the plurality of flexible conductive wires.

In another embodiment of the present invention, the apparatus further includes a first connector and a second connector and a plurality of flexible conductive wires. The first connector is provided in the casing and electrically connected to the storage section, and the second connector is provided in the protective housing and connected to the first connector via the plurality of flexible conductive wires.

Thus, the invention described herein makes possible the advantage of providing an apparatus and a storage unit having a sufficiently small flexible mounting mechanism that vibration resistance and impact resistance of the storage unit is ensured; no defective recording or reproduction of data is caused by vibration and impact; no damage to the storage medium by a magnetic head is caused by vibration and impact; and no breakage of the magnetic head is caused.

This and other advantages of the present invention will become apparent to those skilled in the art upon reading and understanding the following detailed description with reference to the accompanying figures.

DESCRIPTION OF THE PREFERRED EMBODIMENTS

EXAMPLE 1

Hereinafter, an apparatus 100 having a flexible mounting mechanism according to a first example of the present invention will be described with reference to the accompanying figures.

Figure 1:
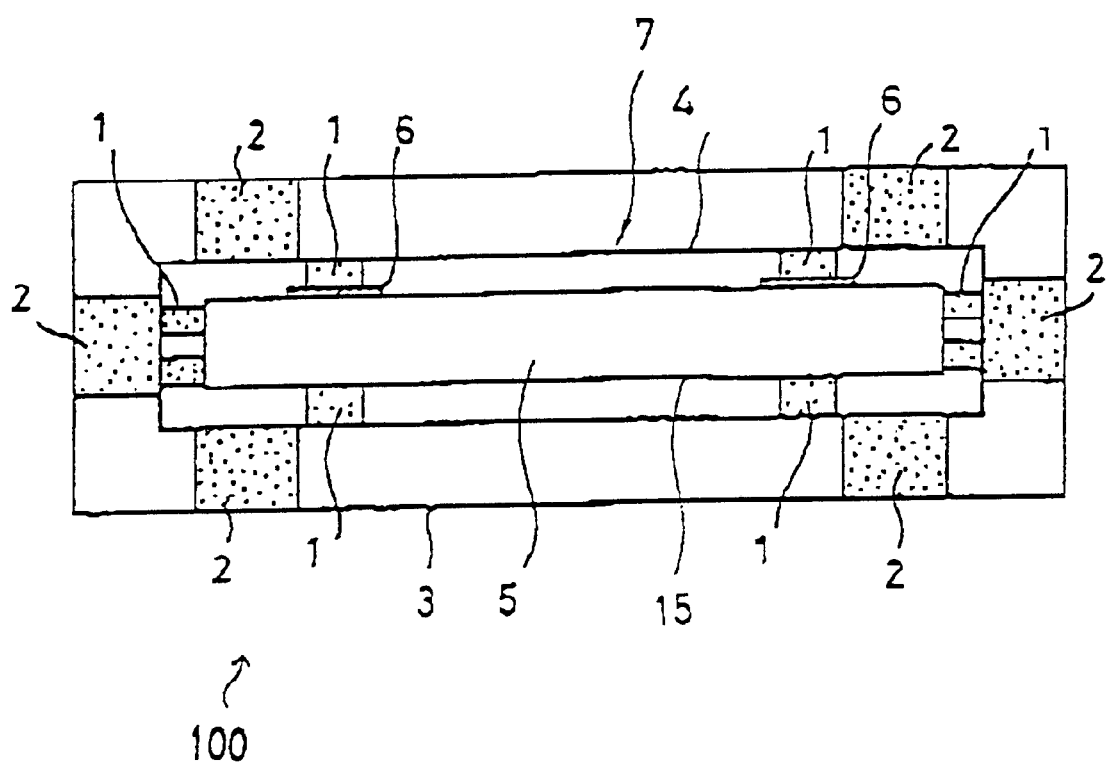
FIG. 1 is a cross-sectional view showing an apparatus and a storage unit pack having the flexible mounting mechanism according to a first example of the present invention.

FIG. 1 is a cross-sectional view showing the apparatus 100 having the flexible mounting mechanism according to the first example of the present invention. The apparatus 100 includes a main body 3, a storage unit pack 7 and maintaining members 2.

The main body 3 accommodates the storage unit pack 7. The storage unit pack 7 includes supporting members 1, a protective housing 4, a memory 5, and receiving members 6. The storage unit pack 7 is maintained within the main body 3 by the maintaining members 2 which absorb vibration. In the first example, an HDA is used as the memory 5.

As shown in FIG. 1, the supporting members 1 are provided between the HDA 5 and the protective housing 4 provided for protecting the HDA 5. In the first example, the supporting members 1 are provided in the longitudinal and thickness directions of the HDA 5. Alternatively, the supporting members 1 can be provided in the longitudinal and width directions, the width and thickness directions, or in the thickness, width and longitudinal directions.

The receiving members 6 may be fixed on the surface of a casing 15 of the HDA 5 such that each supporting member 1 is provided between the protective housing 4 and a receiving member 6. Thus, HDA 5 is fixed in the protective housing 4. The receiving members 6 protect the surface of the casing 15 and indicate the locations where the supporting members 1 are to be fixed.

The maintaining members 2 for supporting the protective housing 4 are provided in the main body 3. As will be described later, the protective housing 4 is removable from the device 3.

Figure 9:
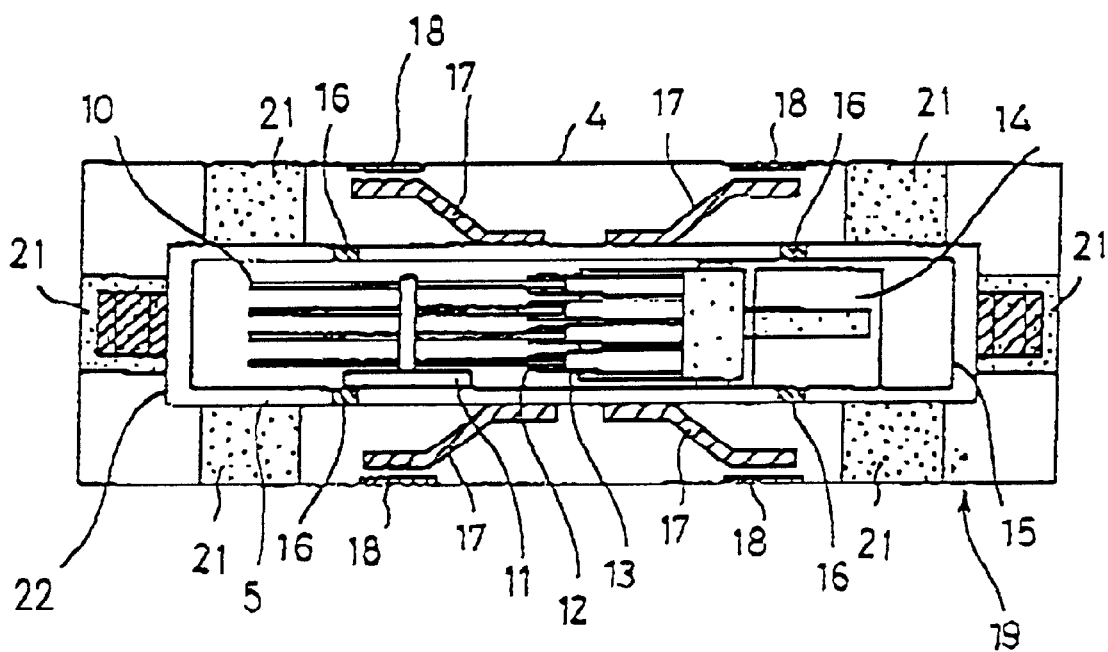
FIG. 9 is a cross-sectional view showing an exemplary storage unit pack having a flexible mounting mechanism according to the present invention.

As shown in FIG. 9, the HDA 5 includes a casing 15, storage media 10 for storing data, a spindle motor 11 for rotating the storage media 10, heads 12 for recording data in the storage media 10 and reproducing data stored in the storage media 10; arms 13 for supporting the heads 12, and a driving section 14 capable of moving the arms 13 to position the heads 12 over arbitrary locations on the storage media 10. The spindle motor 11 and the driving section 14 are attached to the casing 15. Preferably, the storage media are disks.

Hereinafter, materials usable for the supporting members 1 and the maintaining members 2 will be described.

The storage unit pack 7 is in an inoperative state when being separated from the main body 3 and carried. In such a state, it is more important to reduce impact on the HDA 5 (for example, when the storage pack 7 is dropped on the ground) compared to the external vibration caused on the storage unit pack 7. Thus, the supporting members 1 are preferably made of a material that reduces the impact on the HDA 5 in the storage unit pack 7 with a relatively small deformation, for example, a gel-like material or a butyl rubber.

The storage unit pack 7 is in an operating state when stored in the main body 3 for recording or reproducing data. In such a state, it is more important to reduce vibration on the storage unit pack 7 than to reduce the impact on the HDA 5. Thus, the maintaining members 2 are preferably made of a material having an optimum damping characteristics according to the use conditions of the main body 3, for example, a gel-like material, a rubber material, or a rubber material with oil sealed inside. Materials for the supporting members 1 and the maintaining members 2 are chosen such that a spring constant of the supporting member 1 is larger than that of the maintaining member 2.

The protective housing 4 is preferably made of a resin. Assuming that the protective housing 4 breaks at an impact acceleration of Gh and the HDA 5 is incapacitated for recording or reproducing data at an impact acceleration of Gf, the impact strength of the protective housing 4 is set to be a value such that the impact acceleration Gh is smaller than the impact acceleration Gf. By setting Gh to such a value, the protective housing 4 breaks before the HDA 5 is incapacitated for recording or reproducing data. The breakage of the protective housing 4 reduces the impact on the HDA 5. Thus, the HDA 5 is prevented from breaking even when an excessive impact is applied on the storage unit pack 7 while the storage unit pack 7 is carried separately from the main body 3.

To reduce vibration near a primary resonance point of the arm 13 supporting the head 12 and a self-induced vibration of the spindle motor 11, the primary resonance frequency f determined by the mass of the storage unit pack 7 and the spring constant of the maintaining member 2 is preferably lower than the primary resonance frequency of the arm 13 and the rotational frequency of the spindle motor 11.

The primary resonance frequency f is obtained by the following equation, $$f = (k/m)^{1/2}/(2\pi)$$

where m is a mass of the storage unit pack 7 and k is a spring constant of the maintaining member 2. The mass of the storage unit pack 7 is the total mass of the supporting members 1, the protective housing 4, and the HDA 5 which are maintained by the maintaining members 2.

Figure 2:
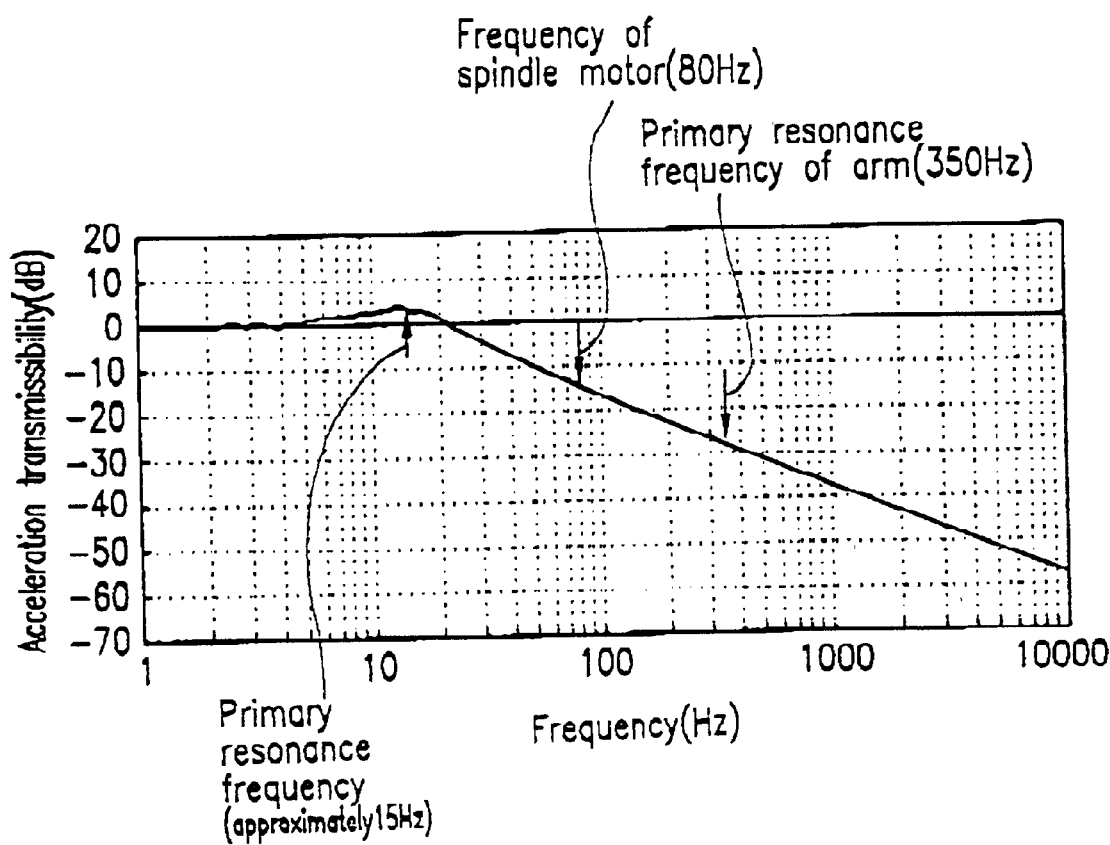
FIG. 2 is a graph showing the relationship between the acceleration transmissibility and the frequency response of maintaining member according to the first example of the present invention.

FIG. 2 is a graph showing the relationship between the acceleration transmissibility and the frequency response of the maintaining member 2. Since the primary resonance frequency f of the maintaining member 2 is lower than the primary resonance frequency of the arm 13 and the rotational frequency of the spindle motor 11, the vibration caused at the primary resonance frequency of the arm 13 and the rotational frequency of the spindle motor 11 can be sufficiently reduced. Thus, damage to the storage media 10 or defective recording and/or reproduction of data is inhibited even when external vibration is applied to the main body 3 while recording or reproducing data.

The protective housing 4 is removable from the main body 3. Hereinafter, a structure of the main body 3 including the removable protective housing 4 will be described with reference to FIGS. 3 through 5.

Figure 3:
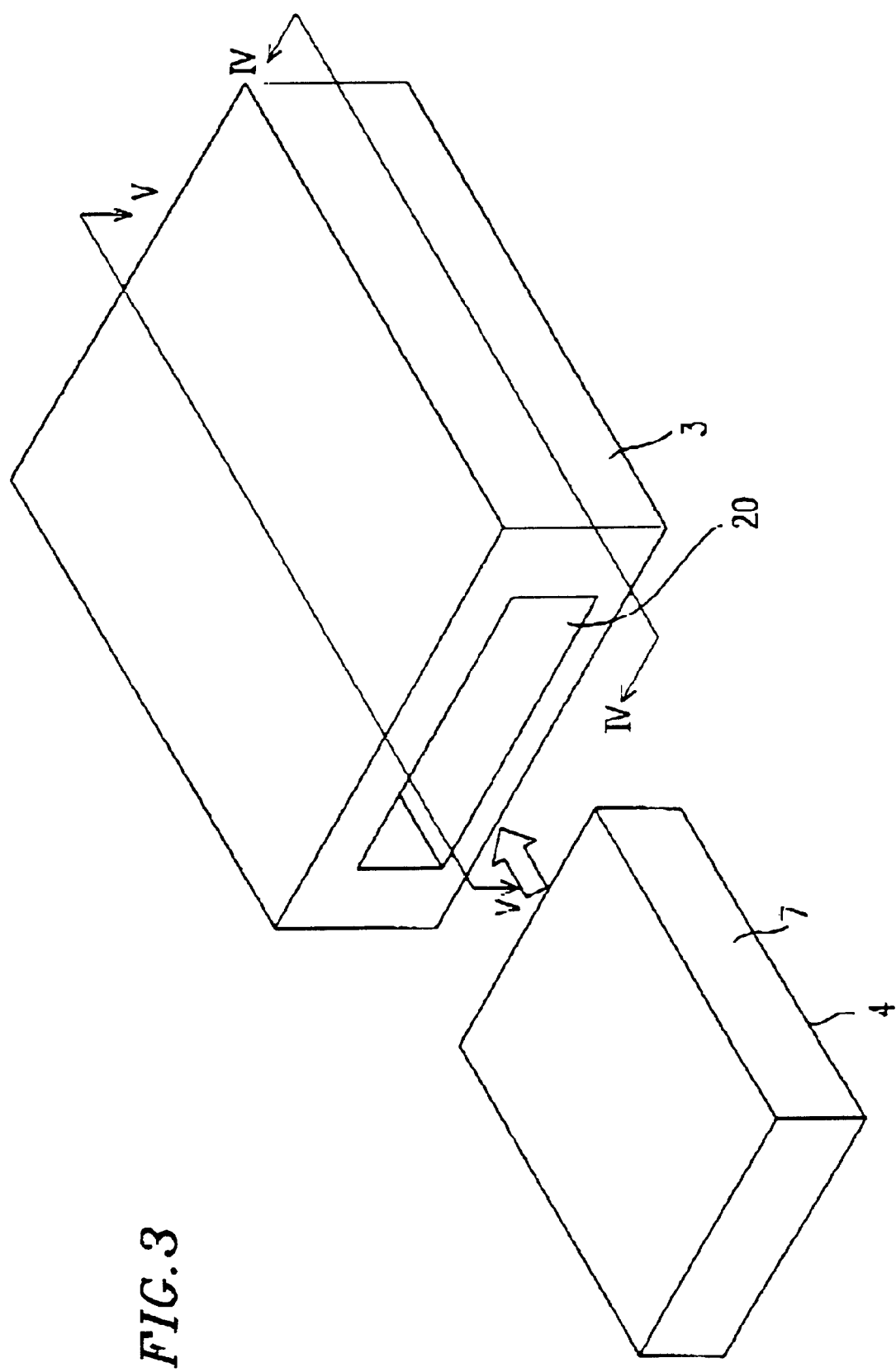
FIG. 3 is an isometric view showing the apparatus and the storage unit pack according to the first example of the present invention.
Figure 4:
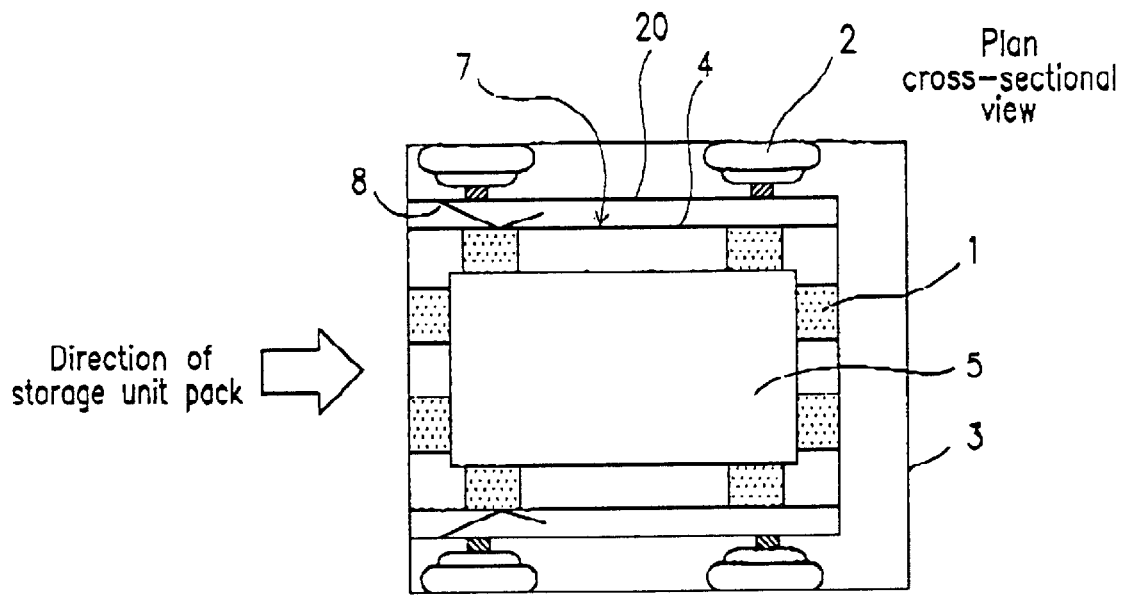
FIG. 4 is a plan cross-sectional view cut along line IV—IV in FIG. 3 showing the apparatus and the storage unit pack according to the first example of the present invention.
Figure 5:
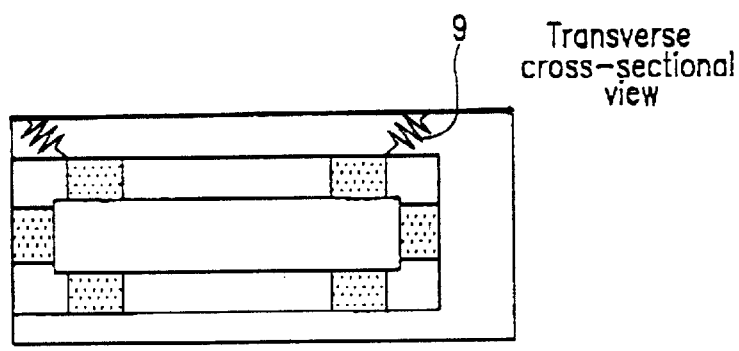
FIG. 5 is a transverse cross-sectional view cut along line V—V in FIG. 3 showing the apparatus and the storage unit pack according to the first example of the present invention.

FIG. 3 is an isometric view showing the protective housing 4 and the main body 3 separated from each other; FIG. 4 is a plan cross-sectional view cut along line IV—IV in FIG. 3 showing the main body 3 accommodating the protective housing 4; and FIG. 5 is a transverse cross-sectional view cut along line V—V in FIG. 3 showing the main body 3 accommodating the protective housing 4.

The main body 3 may further include a plurality of securing members 8, a plurality of suspension springs 9 and a frame 20, which are provided for allowing the protective housing 4 to be removable from the main body 3.

As shown in FIG. 4, the protective housing 4 is held by the frame 20 while being installed in the main body 3. The frame 20 is coupled to the main body 3 by the maintaining members 2. As shown in FIG. 5, the frame 20 is suspended from the inner surface of the main body 3 by the suspension springs 9. The suspension springs 9 are capable of supporting the weight of the frame 20 (i.e., the storage unit pack 7).

Once the protective housing 4 is inserted into the main body 3 and reaches a predetermined position, the securing members 8 secure the protective housing 4. The securing members 8 may hold the protective housing 4 while the protective housing 4 is being inserted into the main body 3.

Although an HDA is used as the storage unit in the first example, any storage unit can be used as long as it is capable of physically affecting the storage medium to record or reproduce data by using magnetic fields, light, heat or static electricity.

EXAMPLE 2

Hereinafter, an apparatus having a flexible mounting mechanism according to a second example of the present invention will be described with reference to the accompanying figures.

Figure 6:
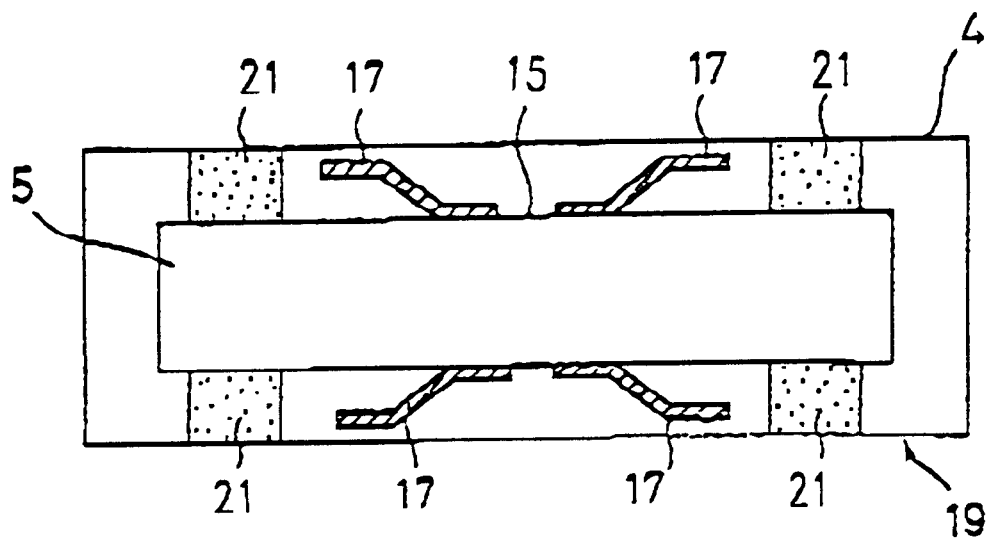
FIG. 6 is a cross-sectional view showing a storage unit pack having a flexible mounting mechanism according to a second example of the present invention.
Figure 7:
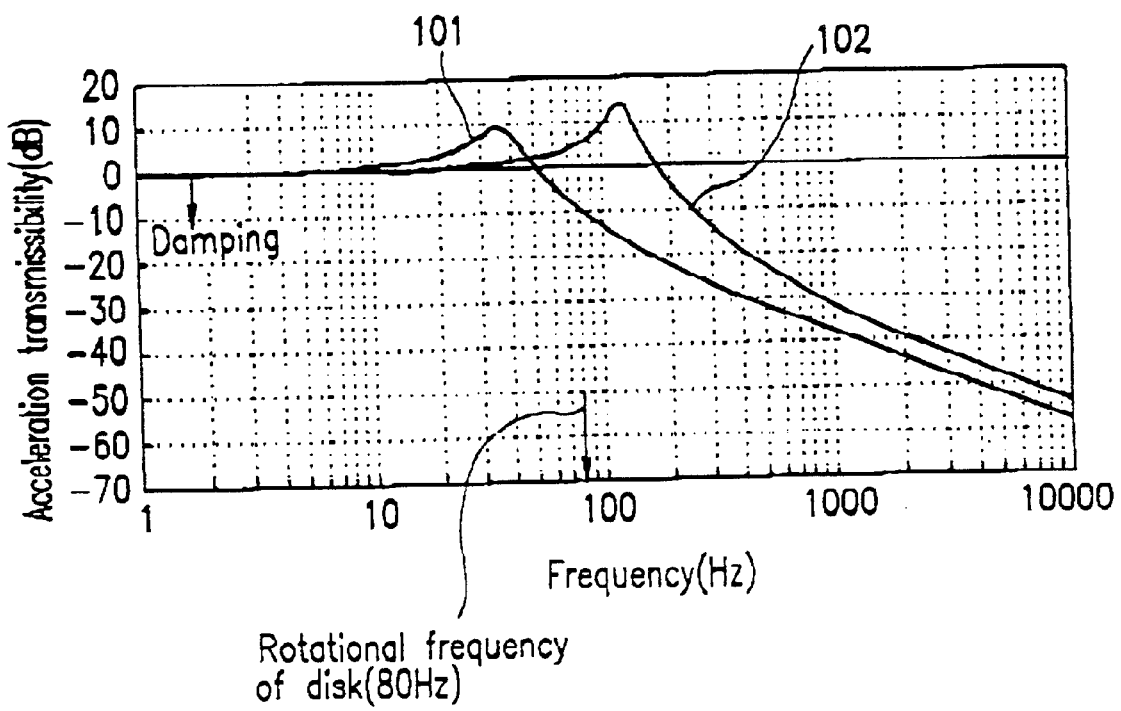
FIG. 7 is a graph showing the response characteristics of supporting members according to the second example of the present invention.

FIG. 6 is a cross-sectional view showing a storage unit pack 19 having the flexible mounting mechanism according to the second example of the present invention. FIG. 7 is a graph showing the response characteristics of elastic members 17 and supporting members 21. Components having like functions and effects are denoted by the same reference numerals as those in the first example, and the description thereof is omitted.

The storage unit pack 19 having the flexible mounting mechanism includes a protective housing 4, an HDA 5, elastic members 17 and maintaining members 21.

The maintaining members 21 are provided between the protective housing 4 and the HDA 5 to absorb impact and vibration applied on the HDA 5. As shown in FIG. 6, the maintaining members 21 are provided in the longitudinal (not shown) and thickness directions of the HDA 5. The supporting members 21 can be alternatively provided in the longitudinal and width directions, the width and thickness directions, or in the thickness, width and longitudinal directions of the HDA 5.

Each of the elastic members 17 has one end attached to the HDA 5 and the other end being a free end. Therefore, as shown in FIG. 6, a space is provided between the protective housing 4 and each free end of elastic members 17 when the storage unit pack 19 is under steady-state conditions (i.e., when the storage unit pack 19 is under no impact or no vibration or other acceleration). The one end of each elastic member 17 may be attached to the protective housing 4 instead of the HDA 5. In that case, space is provided between the casing 15 of the HDA 5 and each free end of the elastic members 17 when the storage unit pack 19 is under steady-state conditions.

When a strong impact is incident on the protective housing 4, the supporting members 21 deform such that the elastic members 17 contact the protective housing 4 to reduce the impact on the HDA 5. The elastic members 17 can be located between the protective housing 4 and the HDA 5 in the longitudinal and width directions, width and thickness directions, or thickness, width and longitudinal directions of the HDA 5.

The supporting members 21 are preferably made of a material with relatively low hardness which reduces vibration as much as possible, such as a gel-like material (e.g., silicon), a soft butyl rubber, or a butyl rubber with silicone oil sealed inside.

The elastic members 17 are preferably made of a material which reduces impact as much as possible, such as a leaf spring-like elastic material, a rubber, a butyl rubber or a butyl rubber with silicone oil sealed inside. The leaf spring-like elastic members may be a metal leaf spring-like elastic members.

Since the supporting members 21 are intended to absorb vibration whereas the elastic members 17 are intended to mainly absorb impact, the spring constant of the supporting members 21 is preferably lower than that of the elastic members 17.

In the case where the storage medium of the HDA 5 is a disk, the supporting members 21 are preferably made of a material which can sufficiently reduce vibration near the rotational frequency of the disk 10 and frequencies higher than the rotational frequency of the disk 10. Referring to FIG. 7, curve 101 represents the response characteristic of the supporting member 21 capable of stabilizing the vibration caused by the rotation of the disk 10 which is assumed to be rotating at the frequency of 80 Hz; and curve 102 represents the response characteristic of the supporting member 21 incapable of stabilizing the vibration caused by the rotation of the disk 10.

Hereinafter, functions of the flexible mounting mechanism shown in FIG. 6 will be described with reference to FIGS. 8A through 8D. For the simplicity of the description, it is assumed that the mass of the HDA 5 is 180 g; the spring constant of the supporting members 21 provided in the thickness direction of the HDA 5 is about 10 kgf/cm; the thickness of the supporting member 21 is 10 mm; the spring constant of the elastic members 17 fixed to the HDA 5 is about 110 kgf/cm; and the height of the elastic member 17

(i.e., the vertical length from the surface of the HDA 5 to the free end of the elastic member 17) is 8 mm. In this example, impact and vibration on the storage unit pack 19 is assumed to be applied only in the thickness direction.

Figure 8A:
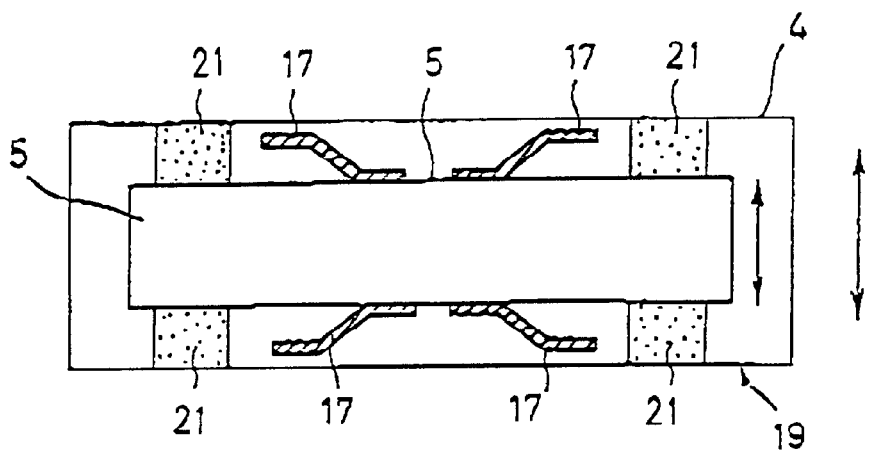
FIGS. 8A through 8D are cross-sectional views showing the function of the storage unit pack according to the second example of the present invention.

FIG. 8A shows a state where an irregular external vibration is applied on the storage unit pack 19. The irregular of the storage unit packs and thereafter testing each storage unit pack as to whether each HDA 5 in each storage unit pack operated properly. The storage unit packs with only the supporting members 21 were tested by varying the thickness and the spring constant of the supporting member 21. Table 1 shows the results obtained by the experiment.

TABLE 1

| | | Example 2 | Comparative examples | | | | | | | | |
|---|---|---|---|---|---|---|---|---|---|---|---|
| Spring constant (kgf/cm) | Supporting member 21 | 10 | 10 | 10 | 10 | 60 | 60 | 60 | 110 | 110 | 110 |
| | Elastic member 17 | 110 | — | — | — | — | — | — | — | — | — |
| Thickness of supporting member 21 (mm) | | 10 | 5 | 10 | 20 | 5 | 10 | 20 | 5 | 10 | 20 |
| Vibration resistance test | Operative state | ○ | ○ | ○ | ○ | × | × | × | × | × | × |
| | Inoperative state | ○ | ○ | ○ | ○ | × | × | × | × | × | × |
| Impact resistance test | | ○ | × | × | ○ | × | × | ○ | × | ○ | ○ | vibration is generated when the storage unit pack 19 is carried or used, or generated upon removal of the storage unit pack 19 of the apparatus (not shown). As shown in FIG. 8A, the HDA 5 is supported by the supporting members 21, which absorb the irregular vibration. Thus, defective recording and/or reproduction of date or elimination of the data stored in the storage medium is not caused.

Figure 8B:
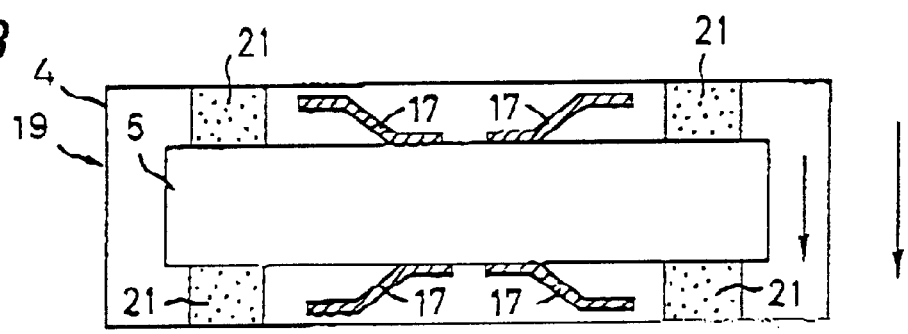
Figure 8C:
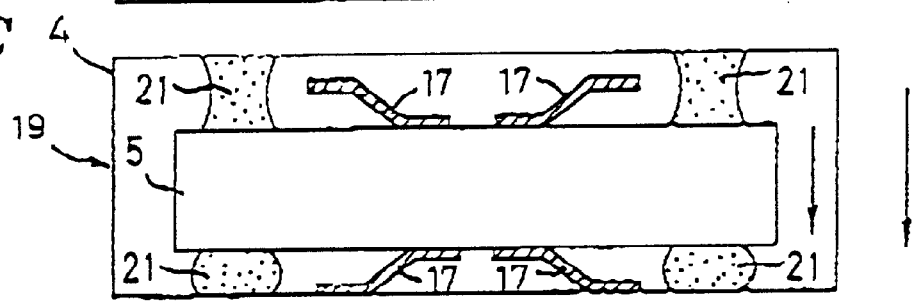
Figure 8D:
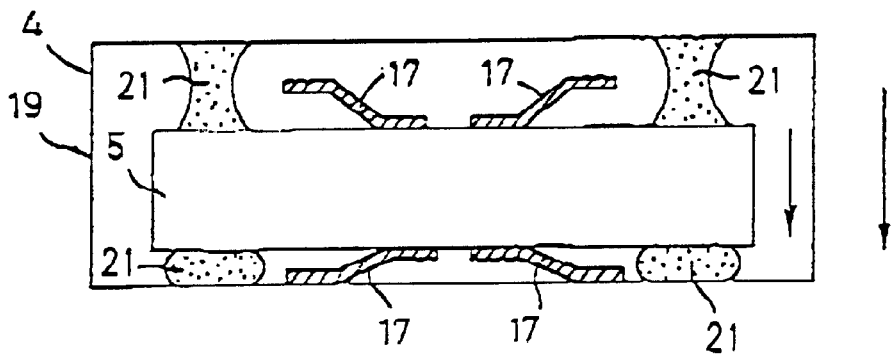

FIGS. 8B through 8D are cross-sectional views showing the function of the storage unit pack 19 under impact caused, for example, by being dropped on the ground. Immediately after the collision, only the supporting members 21 are affected by the impact (FIG. 8B). At this moment, acceleration hardly affects the HDA 5 since the spring constant of the supporting members 21 is relatively small.

Thereafter, the impact will continue to compress the supporting members 21 such that the thickness of the supporting member 21 and the height of the elastic member 17 become the same (i.e., 8 mm) and the elastic members 17 touch the protective housing 4 (FIG. 8C). Since the elastic members 17 have a larger spring constant than that of the supporting members 21, the acceleration on the HDA 5 suddenly increases. Thereafter, the elastic members 17 are compressed and absorb the impact (FIG. 8D). The supporting members 21 also absorb a part of the impact on the HDA 5 while being compressed. Thus, in the second example, the maximum acceleration on the HDA 5 is reduced to such a degree that elimination of the stored data or permanent damage to the storage medium is avoided.

In such a manner, the storage unit pack 19 according to the second example of the present invention can reduce the acceleration applied to the HDA 5. In the case where only the HDA 5 is dropped from a height of, for example, about 80 cm, an acceleration of 1000 G or more is applied to the HDA 5. When the storage unit pack 19 accommodating the HDA 5 is dropped from a height of about 80 cm, an acceleration of approximately only 280 G is applied to the HDA 5.

An experiment was conducted on two kinds of storage unit packs. A first storage unit pack had both supporting members 21 and elastic members 17, while the other storage unit packs only had the supporting members 21. The experiment was conducted by causing vibration or impact on each Hereinafter, the conditions, procedures and testing of the experiment will be described.

Irregular vibrations varying in the range of 20 Hz to 300 Hz with a peak acceleration of 4 G were applied to each of the storage unit packs in the thickness direction using a shaker. The vibration was applied for 30 minutes to each storage unit pack in an operative state (i.e., recording or reproducing data in the HDA 5) and an inoperative state.

While the storage unit pack was being shaken, data was recorded and reproduced to observe defective recording or reproduction of the data, elimination of the data, and permanent damage to the storage medium. After shaking each storage unit pack, data that was recorded during the vibration was again reproduced to observe defective recording or reproduction of data, elimination of data, and permanent damage to the storage medium.

In the case of an inoperative storage unit pack, data was stored in the HDA 5 in advance of the shaking procedure. After the shaking procedure, the data was reproduced to observe defective recording or reproducing of data, elimination of the data, and permanent damage to the storage medium.

The results of the vibrations tests are shown in Table 1. 0 represents no defective recording and reproduction of data, no elimination of data, and no permanent damage. x represents the case where at least one of defective recording or reproduction of data, elimination of data, or permanent damage occurred at least once or at least in one place.

Impact was applied to each storage unit pack by the following procedure.

Data was stored in the whole data area of the HDA 5 of each storage unit pack. Then, each storage unit pack was dropped from a height of 76 cm. Thereafter, the written data was reproduced to observe any elimination of the data and any permanent damage to the HDA 5. Then, data was again recorded and reproduced for the whole data area of the storage medium to observe any elimination of the data and any permanent damage to the HDA 5.

The results of the impact tests are shown in Table 1. 0 represents no elimination of data and no permanent damage. x represents elimination of data or permanent damage at least once or at least in one place.

As can be appreciated from Table 1, impact on the HDA 5 can be eased to a certain extent even in the case of storage unit packs using only the supporting members 21. However, in such a case, the supporting members 21 need to be thicker than those of the storage unit pack 19 having elastic members 17 according to the second example of the present invention. Thus, the storage unit pack having only the supporting members 21 is not appropriate when size reduction is taken into consideration. Results similar to those shown in Table 1 were obtained for experiments in which the vibration and impact were caused either in the longitudinal or width direction.

As shown in FIG. 9, receiving members 18 for receiving the elastic members 17 are preferably provided in the storage unit pack 19 so that the protective housing 4 is prevented from breaking under impact.

As shown in FIG. 9, the storage unit pack 19 may also include fixing members 16 and a receiving case 22. The HDA 5 is fixed on the receiving case 22 by the fixing members 16. The supporting members 21 and the elastic members 17 are adhered to the receiving case 22.

The storage unit pack 19 may further include a control substrate (not shown) for controlling, for example, the spindle motor and the driving section, and a physical interface for inputting data in the HDA 5 and outputting data from HDA 5.

A plurality of elastic members 17 can be provided in the width, longitudinal, and thickness directions of the HDA 5. The spring constant of each elastic member 17 can be different from each other as long as the elastic members 17 sufficiently dissipate the impact. In such a case, each of the spring constants of the elastic members 17 should be set to satisfy the relationship, $$k1 < k2 + k3 + \ldots$$

where the spring constant of the supporting member 21 is k1, and the spring constant of each of the elastic members 17 is k2, k3, ..., respectively.

Although an HDA is used as the storage unit in the second example, any storage unit can be used as long as it is capable of physically affecting the storage medium to record or reproduce data by using magnetic fields, light, heat or static electricity.

EXAMPLE 3

Hereinafter, an apparatus having a flexible mounting mechanism according to a third example of the present invention will be described with reference to the accompanying figures.

Figure 10:
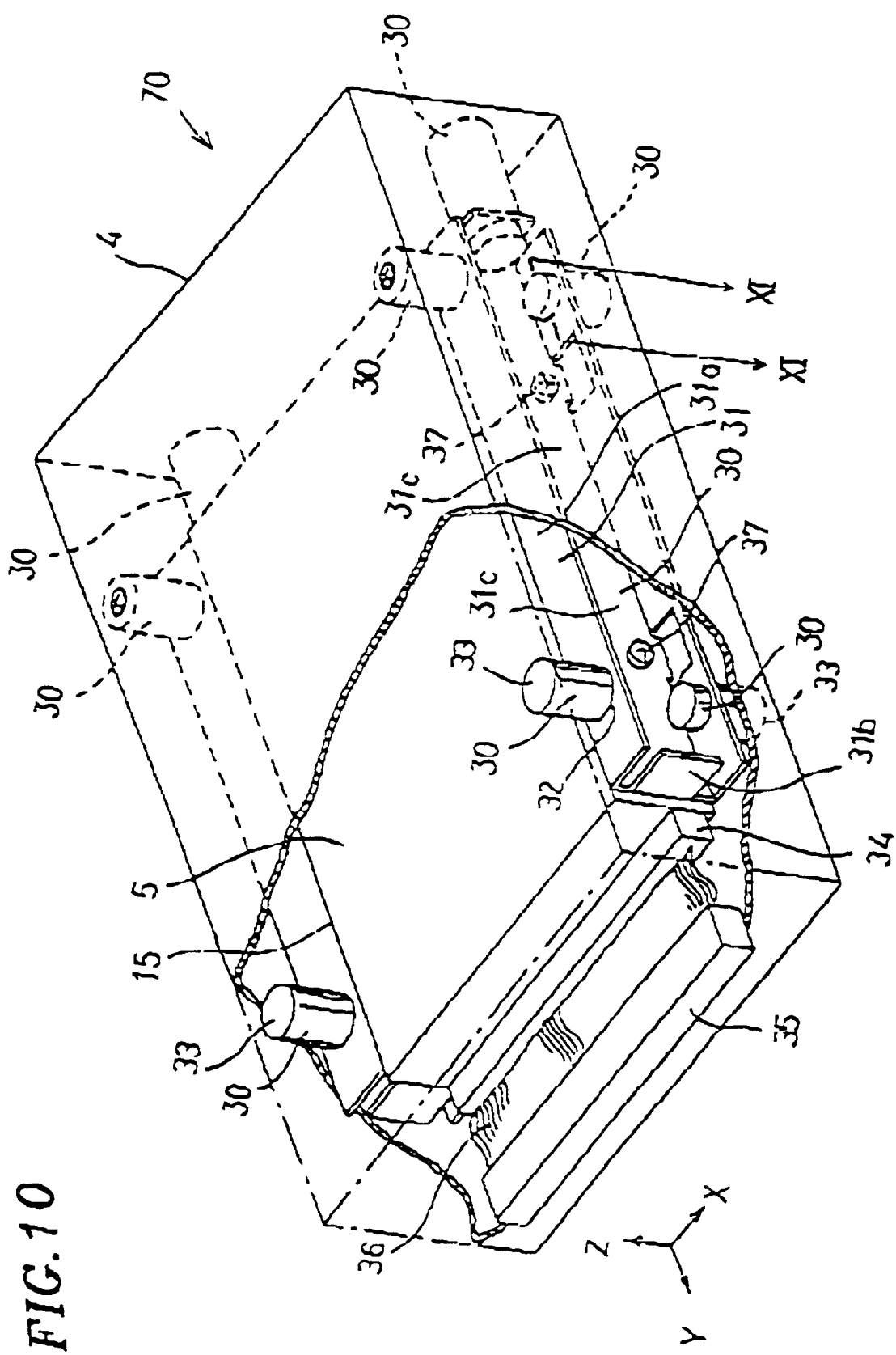
FIG. 10 is a cross-sectional perspective view showing the storage unit pack having a flexible mounting mechanism according to a third example of the present invention.

FIG. 10 is a cross-sectional perspective view showing a storage unit pack 70 having the flexible mounting mechanism according to the third example of the present invention. Components having like functions and effects are denoted by the same reference numerals as those in the first and second examples, and the description thereof is omitted.

The storage unit pack 70 includes a protective housing 4, an HDA 5, a plurality of supporting members 30 and at least two receiving members 31 for receiving the supporting members 30.

Each of the receiving members 31 has a pair of first planes 31a along the x-y plane, a pair of second planes 31b along the x-z plane and a third plane 31c along the y-z plane. Each of the first planes 31a has at least one hole for receiving the supporting members 30; and one of the pair of second planes 31b has at least one hole for receiving the supporting members 30. The plane 31b with a hole may be opposed to the other plane 31b with no hole. Each of the third planes 31c is fixed to the HDA 5, for example, by screws 37 so as to sandwich the HDA 5. The third planes 31c are preferably provided along a longitudinal direction (i.e., along y-axis) of the HDA 5.

Figure 11A:
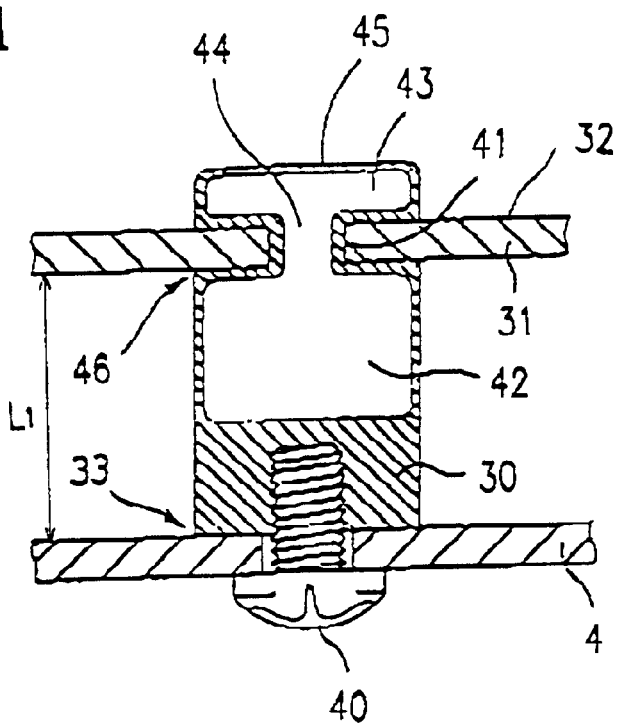
FIGS. 11A and 11B are cross-sectional views showing the storage unit pack cut along a line XI—XI in FIG. 10.
Figure 11B:
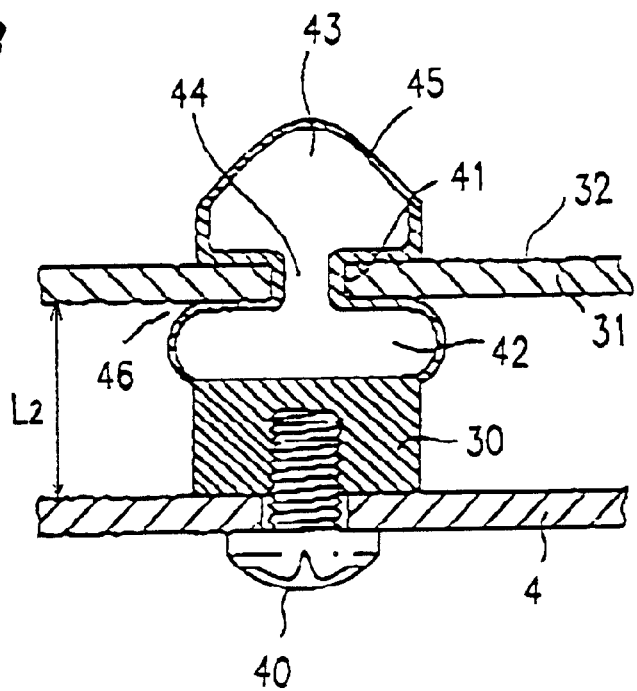

Hereinafter, a structure and a function of the supporting members 30 will be described with reference to FIGS. 11A and 11B. FIGS. 11A and 11B are cross-sectional views showing the storage unit pack 70 cut along a line XI—XI in FIG. 10.

As shown in FIG. 11A, the supporting members 30 include an end portion 33, a first hollow 42, a second hollow 43 and a neck 44. Each end portion 33 is fixed to the protective housing 4 by a fixing member (e.g., a screw) 40, so as to be located between the protective housing 4 and the plane 31a, or between the protective housing 4 and the plane 31b.

The first hollow 42 exists between the protective housing 4 and either the plane 31a or the plane 31b. The second hollow 43 protrudes from a surface 32 of the plane 31a or the plane 31b which faces away from the protective housing 4. The first hollow 42 communicates with the second hollow 43 through the neck 44. A medium filling the first hollow 42 may flow into the second hollow 43 through the neck 44. As the pressure within the second hollow 43 increases upon pressurization of the medium into the second hollow 43, an elastic film 45 of the supporting member 30 expands. The capacity of the first hollow 42 decreases correspondingly. Similarly, the medium filling the second hollow 43 may flow into the first hollow 42 through the neck 44. The first and second hollows 42 and 43 are sealed so that the medium will not leak. The medium can be either liquid or gas. In the case of a liquid medium, the medium is preferably a viscous fluid such as grease. In the case of a gas medium, the medium can be air.

Hereinafter, function of the supporting members 30 will be described.

As shown in FIG. 11A, a distance between the protective housing 4 and the planes 31a and 31b under steady-state conditions is denoted by symbol $L_1$. When a force (for example, due to impact or vibration) such that a distance between the protective housing 4 and the planes 31a or 31b becomes short is applied, a portion of the medium in the first hollow 42 flows into the second hollow 43 through the neck 44. In such a case, the capacity of the first hollow 42 diminishes while the capacity of the second hollow 43 increases as the elastic film 45 of the supporting member 30 expands. As a result, as shown in FIG. 11B, the protective housing 4 and the plane 31a or 31b are separated by a shorter distance denoted by symbol $L_2$.

Once the elastic film 45 stretches out and the capacity of the second hollow 43 becomes large, the elastic film 45 starts to retract. As a result, a portion of the medium in the second hollow 43 flows back into the first hollow 42 through the neck 44 such that the capacity of the first hollow 42 returns to almost the same as under steady-state conditions.

The kinetic energy of the medium is consumed due to an orifice effect upon flow of the medium through the neck 44 (i.e., flow of the medium from a larger cross-sectional area to a smaller cross-sectional area or from a smaller cross-sectional area to a larger cross-sectional area). Thus, in the storage unit pack 70 according to the third example of the present invention, impact or vibration on the HDA 5 is dissipated by the medium flowing back and force within the supporting members 30.

Figure 12:
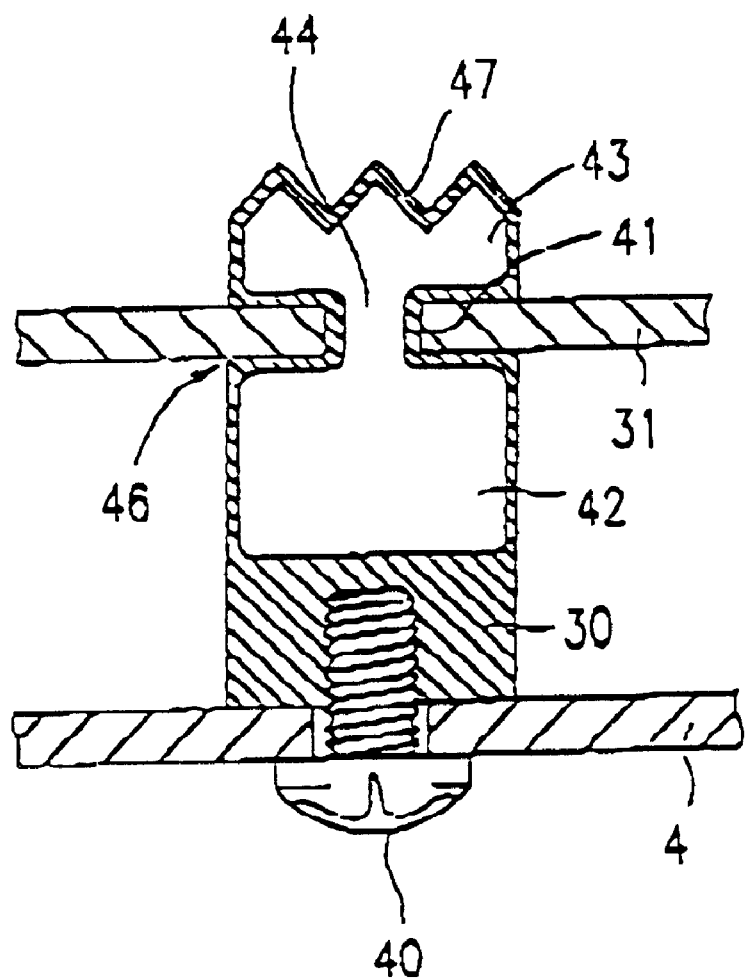
FIG. 12 is a cross-sectional view showing an exemplary supporting member according to the present invention.
Figure 13:
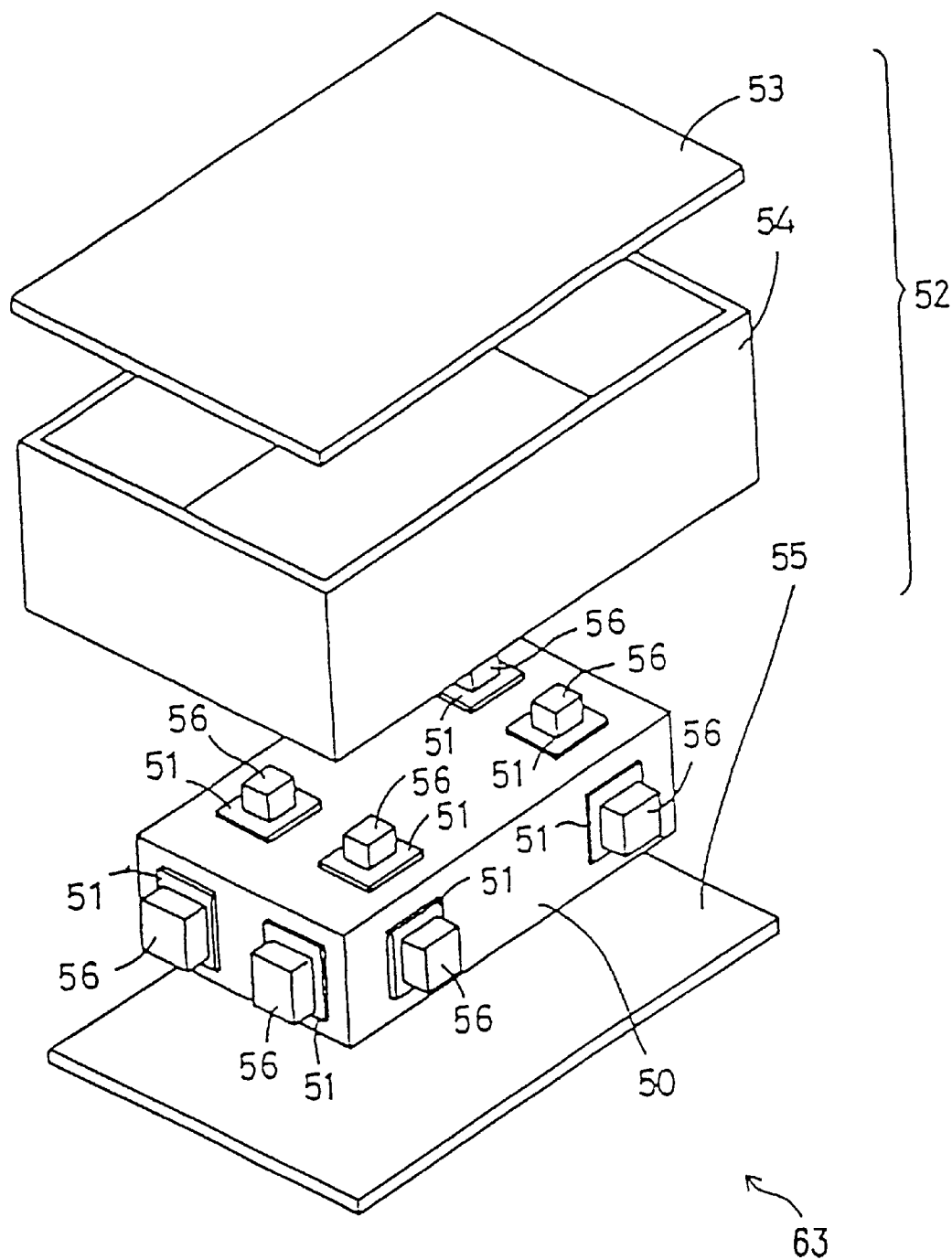
FIG. 13 is an exploded view showing a conventional flexible mounting mechanism of an HDD pack which is removable from an apparatus.
Figure 14:
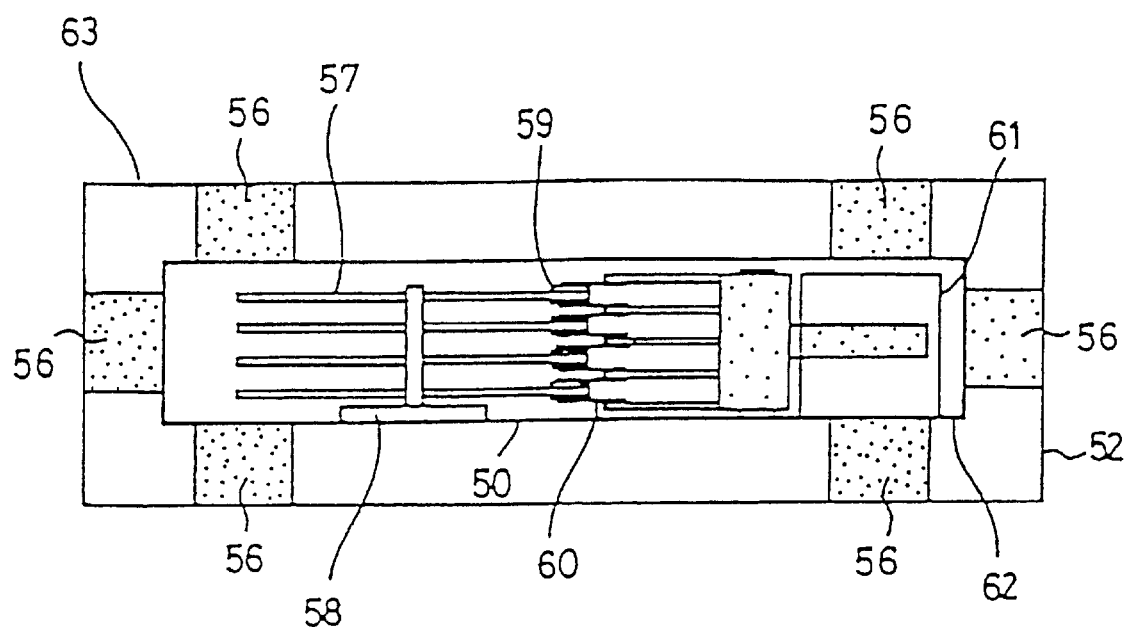
FIG. 14 is a cross-sectional view showing the internal structure of the conventional flexible mounting mechanism.

As shown in FIG. 12, the elastic film may have a bellows shape (elastic film 47). The bellows shape of the elastic film 47 allows greater change in the capacity of the hollow 43.

Although the storage unit pack 70 shown in FIG. 10 has the supporting members 30 along the y-axis (i.e., longitudinal direction) and the z-axis, the supporting members 30 can also be provided along x-axis, y-axis and z-axis.

In the third example, holes 41 are formed in the planes 31a and 31b. Alternatively, a plurality of holes can be formed in the protective housing 4 for receiving the necks 44 of the supporting members 30 while fixing the end portion 33 of the supporting members 30 to the receiving members 31 or to the casing 15 of the HDA 5.

As shown in FIG. 10, the storage unit pack 70 according to the third example of the present invention can further include a first connector 34, a second connector 35, conductive wires 36 and a physical interface (not shown).

The first connector 34 is fixed on the HDA 5. In the case where the storage unit pack 70 according to the third example is a general HDD, the first connector 34 is a connector used for, for example, an SCSI or IDE interface. The first connector 34 is connected to the physical interface while the second connector 35 is fixed to the protective housing 4. The first connector 34 and the second connector 35 are connected to each other by the flexible conductive wires 36. Even when a strong impact is caused on the protective housing 4 such that the HDA 5 moves, the conductive wires 36 are not cut. Thus, input and output of data between the first connector 34 and the second connector 35 remains viable.

The first connector 34, the second connector 35, the conductive wires 36 and the physical interface can be also provided in the apparatus according to the first and the second examples of the present invention.

Although an HDA is used as the storage unit in the third example, any storage unit can be used as long as it is capable of physically affecting the storage medium to record or reproduce data by using magnet fields, light, heat or static electricity.

According to the present invention, an apparatus and a storage unit pack having a flexible mounting mechanism include supporting members and maintaining members having different damping characteristics. Thus, even when vibration of different frequencies are applied to the apparatus or the storage unit pack, the supporting members and the maintaining members can isolate such vibrations from the storage unit in the storage unit pack. Since the spring constant of the supporting members which are provided between the casing of the storage unit and the protective housing is larger than that of the maintaining members, the protective housing is sufficiently protected against the impact. Since the protective housing is sufficiently protected, the protective housing accommodating the storage unit can be removed from the apparatus. Even if the user accidentally drops the protective housing, the storage unit is not likely to be damaged. The storage unit pack according to the present invention has an impact acceleration relationship of, $$Gh < Gf$$

where the protective housing breaks at an impact acceleration of Gh and the storage unit is disabled for operation at an impact acceleration of Gf.

The impact energy is absorbed upon the breakage of the protective housing, and thus damage to the storage unit is prevented. The supporting members according to the present invention sufficiently reduce the vibrations near primary resonance points of the arm and the rotation disk. As a result, even when an external vibration is applied to the storage medium while recording or reproducing data, the storage medium is not damaged.

A storage unit pack having another flexible mounting mechanism according to the present invention includes supporting members and elastic members between the casing of the storage unit pack and the protective housing. A spring constant of the supporting member is smaller than that of the elastic member. An conventional HDD having a certain weight becomes useless by being dropped on a tile floor from the height of 76 cm with impact of 1500 G or more. The storage unit pack according to the present invention having the same weight is still operative even when it is dropped on a tile floor from a height of 76 cm.

A storage unit pack having another flexible mounting mechanism includes supporting members having a first and second hollow portions, a neck portion and a medium. The supporting members are provided between the casing of the storage unit and a protective housing. The medium flows between the first and second hollow portions through the neck portion. The impact on the casing of the storage unit pack is absorbed by the flow of the medium between the first and second hollow portions. Since the supporting members consist of the above-described structure, sufficient damping occurs even if the space between the storage unit and the protective housing is small. An external vibration is isolated from the storage unit through the protective housing because the casing and the protective housing are connected by a flexible conductive wires.

As is apparent from the above description, an apparatus and a storage unit pack having a flexible mounting mechanism according to the present invention can have satisfactory impact and vibration resistances while at the same time the size thereof can be reduced. Thus, the storage unit pack can be incorporated in portable AV devices in the case where the storage unit pack is an HDD. Such a storage unit pack can also be inserted into and ejected from the apparatus.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An apparatus having a flexible mounting mechanism, comprising:

a storage medium;

a casing accommodating and holding the storage medium;

a protective housing accommodating and protecting the casing:

a supporting member provided between the casing and the protective housing for supporting the casing; and a maintaining member supporting the protective housing, wherein the supporting member and the maintaining member have different vibration damping characteristics, and the protective housing is made of a material that satisfies a relationship, $$Gh < Gf$$

where Gh is an impact acceleration at which the protective housing breaks and GF is an impact acceleration at which the storage medium is rendered inoperable.

2. An apparatus having a flexible mounting mechanism, comprising:
   a storage medium;
   a casing accommodating and holding the storage medium;
   a protective housing accommodating and protecting the casing:
   a supporting member provided between the casing and the protective housing for supporting the casing; and
   a maintaining member supporting the protective housing,
   wherein the supporting member and the maintaining member have different vibration damping characteristics,
   the storage medium which stores data is included in a HDA,
   the HDA includes:
      a spindle motor for rotating the storage medium;
      a head for recording data in the storage medium and reproducing data stored in the storage medium; and
      a driving section capable of positioning the head at an arbitrary position with respect to the storage medium, and
   a primary resonance frequency obtained by the spring constant of the supporting member amd the total mass of the HDA, the casing, the supporting member and the protective housing is lower than a rotational frequency of the spindle motor.

3. An apparatus having a flexible mounting mechanism, comprising:
   a storage medium;
   a casing accommodating and holding the storage medium;
   a protective housing accommodating and protecting the casing:
   a supporting member provided between the casing and the protective housing for supporting the casing; and
   a maintaining member supporting the protective housing,
   wherein the supporting member and the maintaining member have different vibration damping characteristics, and
   the supporting member is a gel.

* * * * *

UNITED STATES PATENT AND TRADEMARK OFFICE
CERTIFICATE OF CORRECTION

PATENT NO. : 6,567,265 B1
DATED : May 20, 2003
INVENTOR(S) : Toshiki Yamamura, Toshiyuki Wada and Makoto Kuwamoto It is certified that error appears in the above-identified patent and that said Letters Patent is hereby corrected as shown below:

Column 14,
Line 66, "GF" should be -- Gf --.

Column 16,
Line 2, "amd" should be -- and --; and
Line 21, "gel" should be -- gel member --.

Signed and Sealed this

Fourteenth Day of October, 2003

JAMES E. ROGAN
*Director of the United States Patent and Trademark Office*